US006581511B2

United States Patent
Cusenza et al.

(10) Patent No.: US 6,581,511 B2
(45) Date of Patent: *Jun. 24, 2003

(54) MULTI-RESERVOIR AUTOMATIC DISPENSER SYSTEM

(75) Inventors: Anthony M. Cusenza, Thousand Oaks, CA (US); Tarik Hassane, Newberry Park, CA (US)

(73) Assignee: Romar LLC, Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/096,623

(22) Filed: Mar. 12, 2002

(65) Prior Publication Data

US 2002/0112613 A1 Aug. 22, 2002

Related U.S. Application Data

(63) Continuation-in-part of application No. 09/785,078, filed on Feb. 16, 2001, now Pat. No. 6,357,345.

(51) Int. Cl.[7] .......................... A47J 31/42; A47J 42/16; A47J 42/50; B02C 19/00
(52) U.S. Cl. .............................. 99/357; 99/286; 99/287; 99/289 R; 99/290; 222/132; 222/145.1
(58) Field of Search ........................... 99/357, 509–511, 99/284–290, 295, 299–316; 241/34, 36, 37.5, 100, 199.12, 259.1, 261.2, 261.3; 222/132, 129.1, 145.1, 142.3, 144

(56) References Cited

U.S. PATENT DOCUMENTS

| | | | | |
|---|---|---|---|---|
| 4,790,457 A | * | 12/1988 | Morse et al. | 222/185 |
| 4,903,821 A | * | 2/1990 | Yamaguchi | 198/550.7 |
| 5,988,461 A | * | 11/1999 | Edney et al. | 222/638 |
| 6,062,438 A | * | 5/2000 | Ellis et al. | 222/349 |
| 6,090,423 A | * | 7/2000 | Wetzel | 99/483 X |
| 6,357,345 B1 | * | 3/2002 | Cusenza et al. | 99/357 |

* cited by examiner

Primary Examiner—Timothy F. Simone
(74) Attorney, Agent, or Firm—Pillsbury Winthrop LLP

(57) ABSTRACT

An improved apparatus for dispensing predetermined quantities of dry products simply, reliably, accurately and with an appropriate amount of care so that the product being dispensed is not unduly damaged. The present invention includes a plurality of hoppers, and so is capable of dispensing more than one type of product without forcing the user to go through a reloading step.

8 Claims, 7 Drawing Sheets

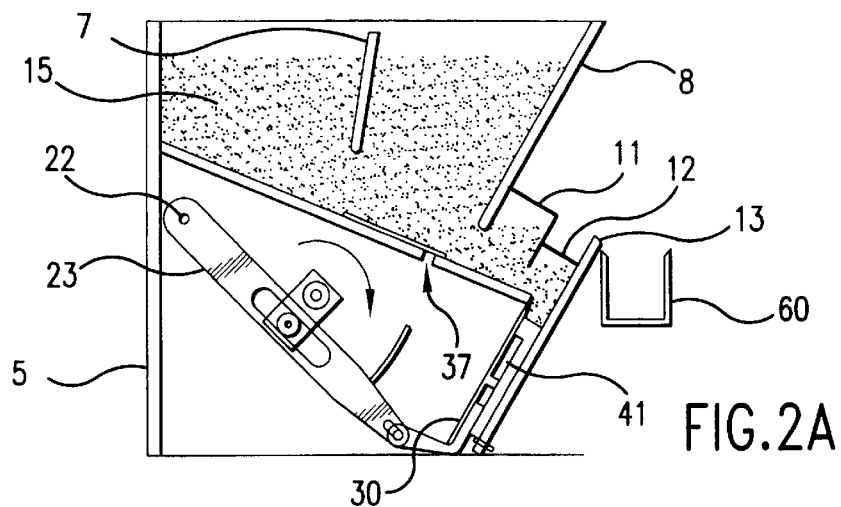
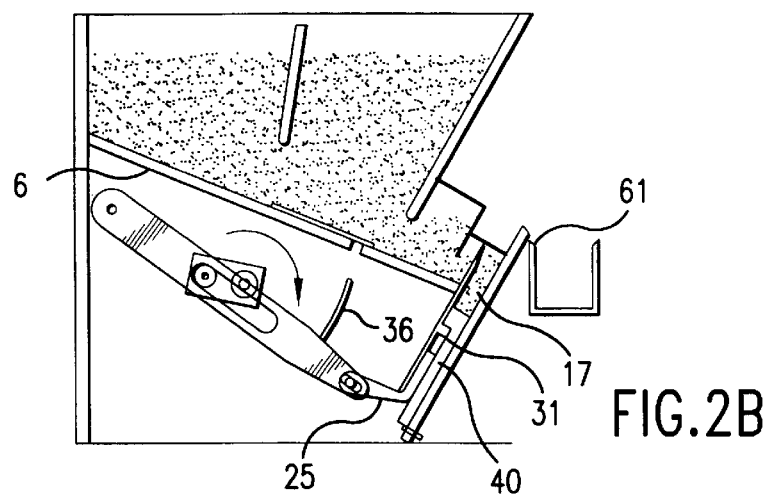
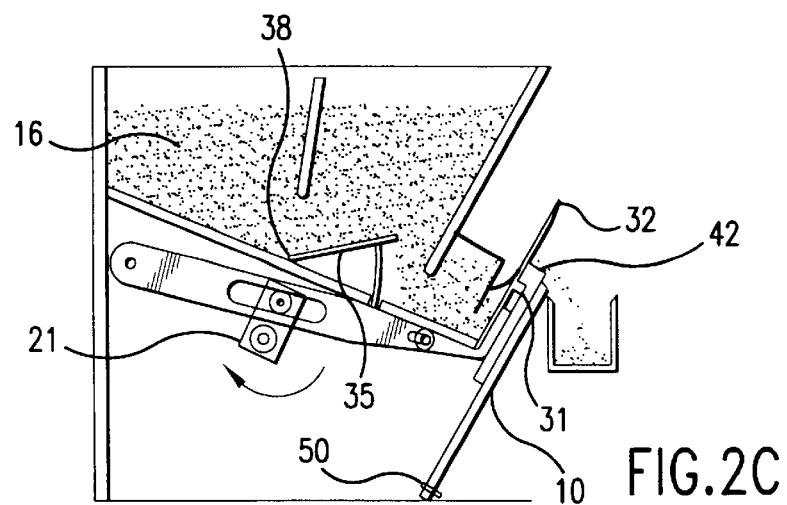

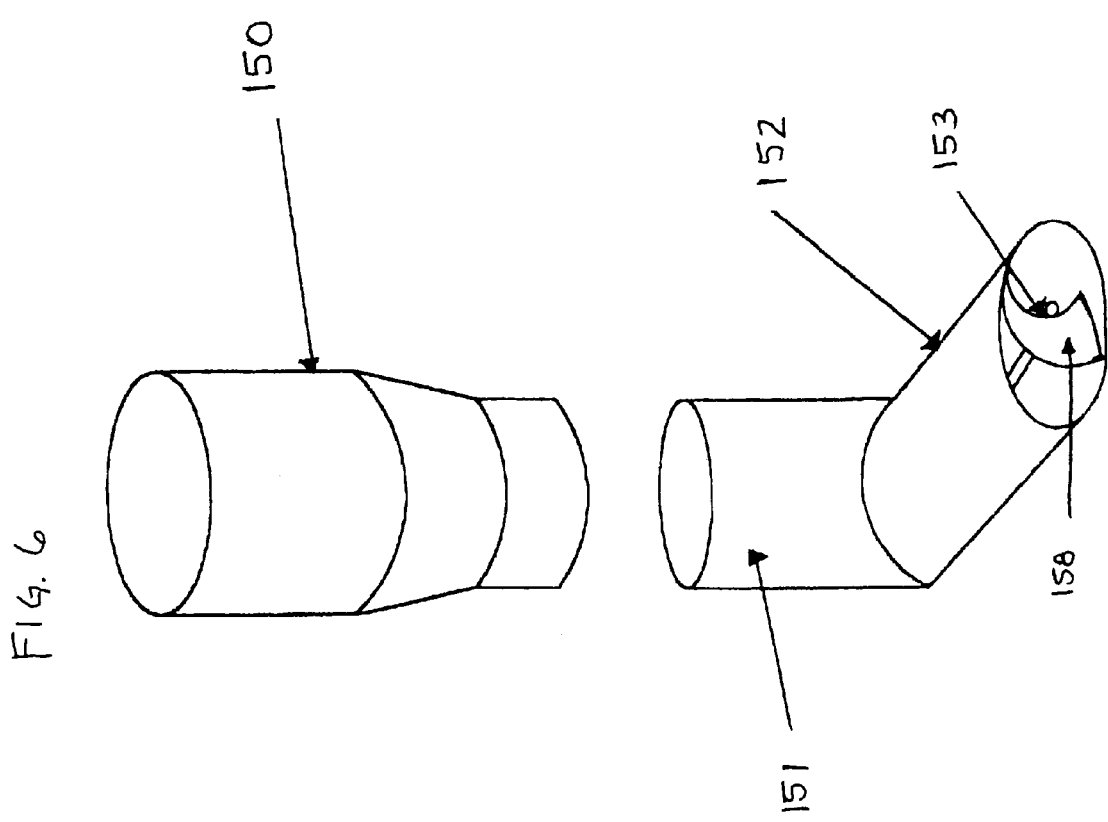

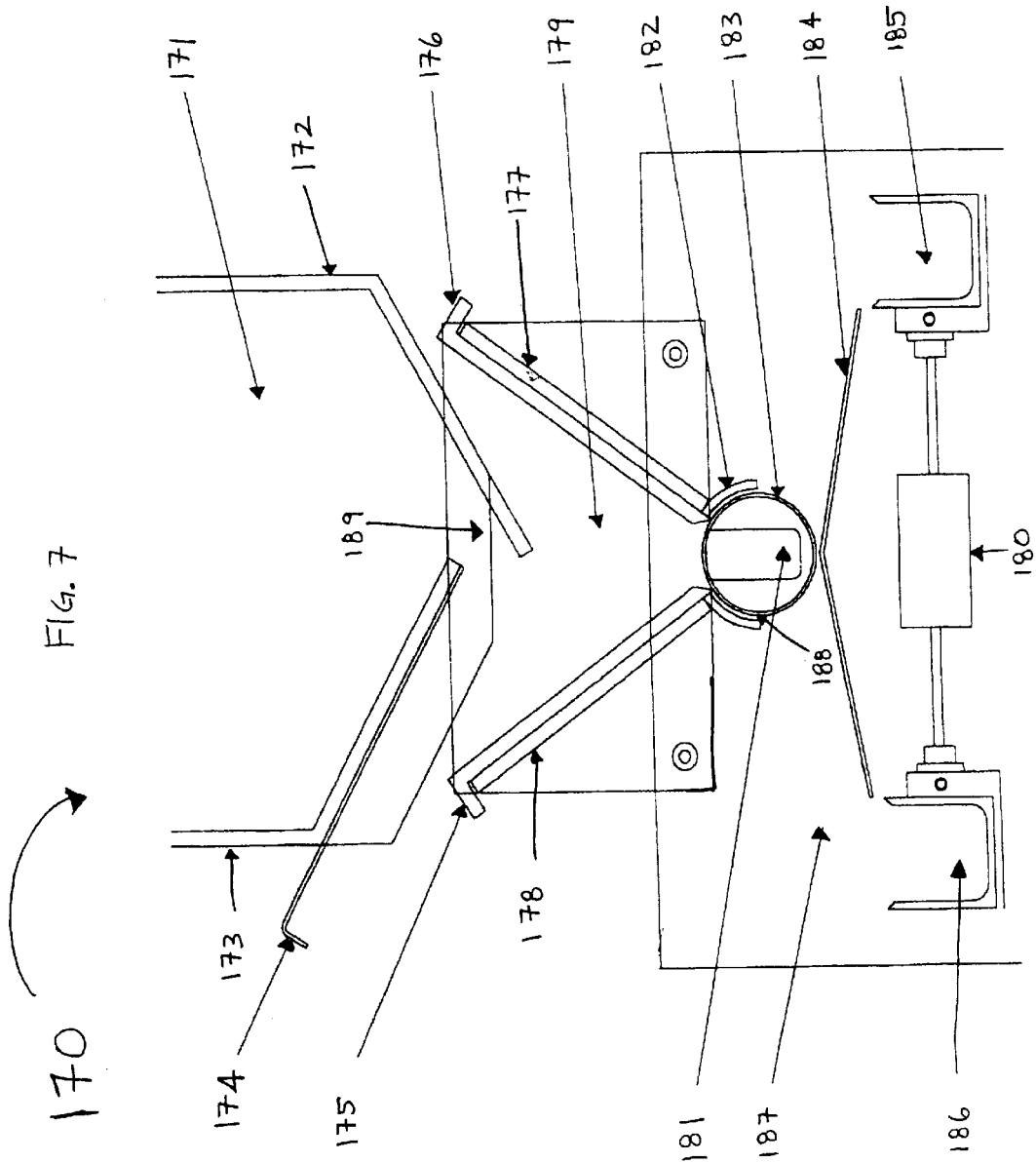

MULTI-RESERVOIR AUTOMATIC DISPENSER SYSTEM

This application is a continuation in part of U.S. Patent application Ser. No. 09/785,078, now U.S. Pat. No. 6,357,345 filed on Feb. 16, 2001.

BACKGROUND OF THE INVENTION

1. Field of the Invention

This invention relates in general to a system for dispensing dry product, and in particular, to a system for dispensing product in a manner that limits breakage or damage of the product.

2. Discussion of the Related Art

It is known in the art to utilize dispensers such as hoppers to dispense dry products, including particulate materials such as gravel and sand, and food products such as beans, peas, pastas and coffee. Such dispensers are very useful, since they allow for storage of and ready access to the material. These dispensers also allow for more versatility. If two such dispensers are appropriately associated with one apparatus, the user has the option of utilizing two different materials with the apparatus.

For example U.S. Pat. No. 5,671,657, to Ford, et al. (the "'657 patent"), discloses the use of multiple hoppers associated with a coffee grinder. In the invention of the '657 patent, each hopper may be used to store a different kind of bean. In this manner, the same grinder may be used to grind caffeinated and decaffinated coffee. This allows the user of the grinder to utilize it in a more versatile and efficient manner. Further, the use of multiple hoppers is cost-efficient. Like other dried food products, coffee tends to be relatively easy to spill during the handling process. It is preferable to use a dispenser, since the coffee only has to be handled during the loading of the dispenser. This leads to less spillage and more efficiency.

The hoppers in the art generally take the form of sloped or vertical containers with an opening at the bottom, through which the stored particles may be dispensed. While this configuration is appropriate for the dispensing of food, it is not ideal. Since the opening of the hopper is at the bottom of the container, the particles in the container have a downward force caused by gravity. There is no way known in the art to control the downward push of the particles. As such, the opening and closing of the bottom of the hopper is not "clean." That is, particles tend to become wedged in the moving part(s) at the bottom of the hopper. Alternatively, the moving part(s) may damage the particles if they are in the way when the opening is closing.

The present invention addresses these and other shortcomings through a method of dispensing material from a plurality of reservoirs in a manner that does not damage the particles. The features and advantages of the present invention will be explored more thoroughly through the following description and drawings. It should be understood, however, that the detailed description and specific examples, while indicating particular embodiments of the invention, are given by way of illustration only, and various modifications may naturally be performed without deviating from the spirit of the present invention.

BRIEF DESCRIPTION OF THE DRAWINGS

FIGS. 2(a)–2(c) illustrate an operational sequence that is capable of being preformed by the apparatus according to one embodiment of the present invention;

FIG. 6 illustrates an assembly of a short cut hopper, with a front view of an auger thread according to one embodiment of the present invention; and FIG. 7 illustrates an assembly of a long cut hopper, with a transparent front view of the interior according to one embodiment of the present invention.

DETAILED DESCRIPTION

The present invention relates to an improved apparatus for dispensing predetermined quantities of dried food products simply, reliably, accurately and with an appropriate amount of care so that the food 15 being dispensed is not unduly damaged. The hoppers of the present invention may be used in conjunction with eachother, so that one apparatus may be capable of dispensing more than one type of foodstuff without forcing the user to go through a reloading step.

In the preferred embodiment of the present invention, the apparatus is utilized to dispense strand-type food, such as spaghetti or linguini. However, it should be understood that the multi-reservoir dispensing system of the present invention may be utilized to dispense many types of dry food including, but not limited to, short pasta, grains, cereals, beans and noodles.

The multi-reservoir automatic dispenser system 1 of one embodiment of the present invention is designed with two food hoppers arranged about a central tilting chute 60 and its associated mechanism in a palindromic manner. For ease of explanation only one of the food hoppers, which will be referred to as the multi-reservoir automatic dispenser system 1 of the present invention, will be described herein. It should be understood that the second hopper operates in the same manner, with the same elements as the first hopper.

Figure 1:
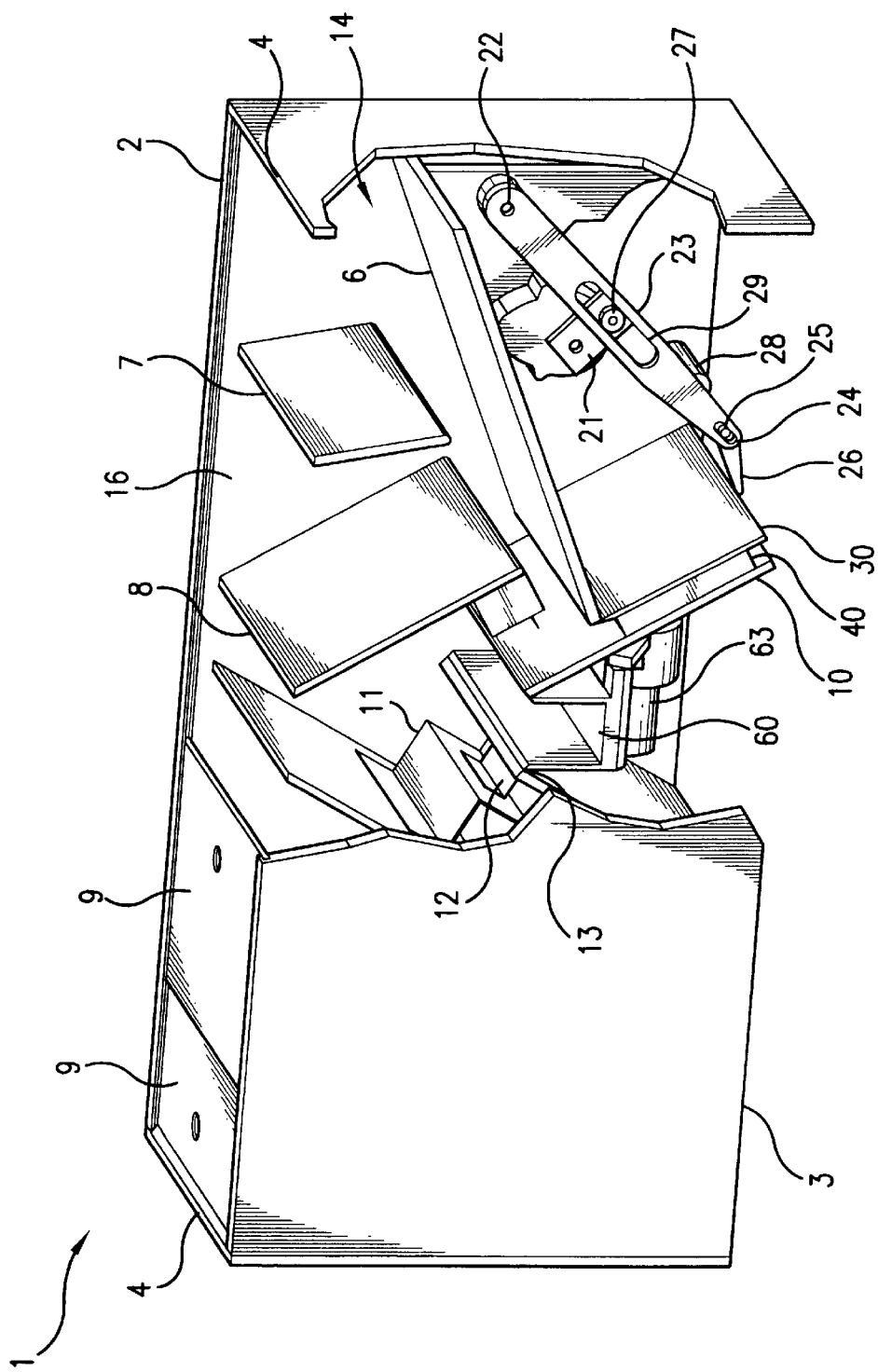
FIG. 1 illustrates an assembly of a precision hopper, with front, end, and top walls partially removed, according to one embodiment of the present invention.

As shown in FIG. 1, the multi-reservoir automatic dispenser system 1 according to one embodiment of the present invention is constituted by three angled panels: a sloped panel 6, the guide panel 7, and the central panel 8. The guide panel 7 is shown for ease of explanation in the figures. It should be understood that one embodiment of the present invention does not include the guide panel 7. These three panels may act in concert to direct the food 15 towards the location where they can be transferred to the central tilting chute 60. The food holding area described generally by the sloped panel 6, the guide panel 7, the central panel 8, end 4, back 2 and front 3 will be referred to as the food reservoir 16 (See FIG. 2).

When food is placed in the present invention, it flows down the sloped panel 6, and underneath the central panel 8 until it comes to rest against the spill off panel 10 and the flexible leveling tab 12, which serves to level the surface of the food and ensure that the appropriate amount is distributed. As more and more food is added to the invention, the food 15 will stack up against the guide panel 7, the sloped panel 6, the central panel 8 and the end 4 of the apparatus.

Guide panel 7 operates primarily to maintain the food 15 in proper alignment with the system.

FIG. 2 illustrates an operational sequence that is capable of being preformed by the apparatus according to one embodiment of the present invention. In FIG. 2(*a*), the food 15 may clearly be seen as resting against, among other things, beveled edge 13, sloped panel 6, guide panel 7, and central panel 8. The dispensing sequence that is depicted in FIGS. 2(*a*)–2(*c*) shows the transfer of one allotment of food from the food reservoir 16 to the central tilting chute 60. Generally, the dispensing sequence occurs when the blade actuating motor 20 drives the arm 23 around the fixed pivot 22 in an oscillating stroke. When not engaging in this operational sequence, the blade 30 is positioned flush with or just below the upper surface of the sloped panel 6.

A general side view of a portion of the present invention as it appears just prior to the dispensing step may be seen in FIG. 2(*a*). The food 15 is resting, in part, against the beveled edge 13 of the spill-off panel 10. There is an arm 23 and a fixed arm pivot 22 about which the arm 23 may pivot. There is a blade 30 that, when moved by the arm 23, serves to partition the portion of the food 15 that will be dispensed from the bulk of the food. There is a shim 11 and a flexible leveling tab 12.

As may be seen in FIG. 2(*b*), when the arm 23 begins to rotate, blade 30 lifts up, and partitions a portion of the food 15. This portion of food 15, which is the amount to be dispensed, is momentarily contained in this configuration by the front 2 of the apparatus, the back 3 of the apparatus, the blade 30 and spill-off panel 10.

Figure 3:
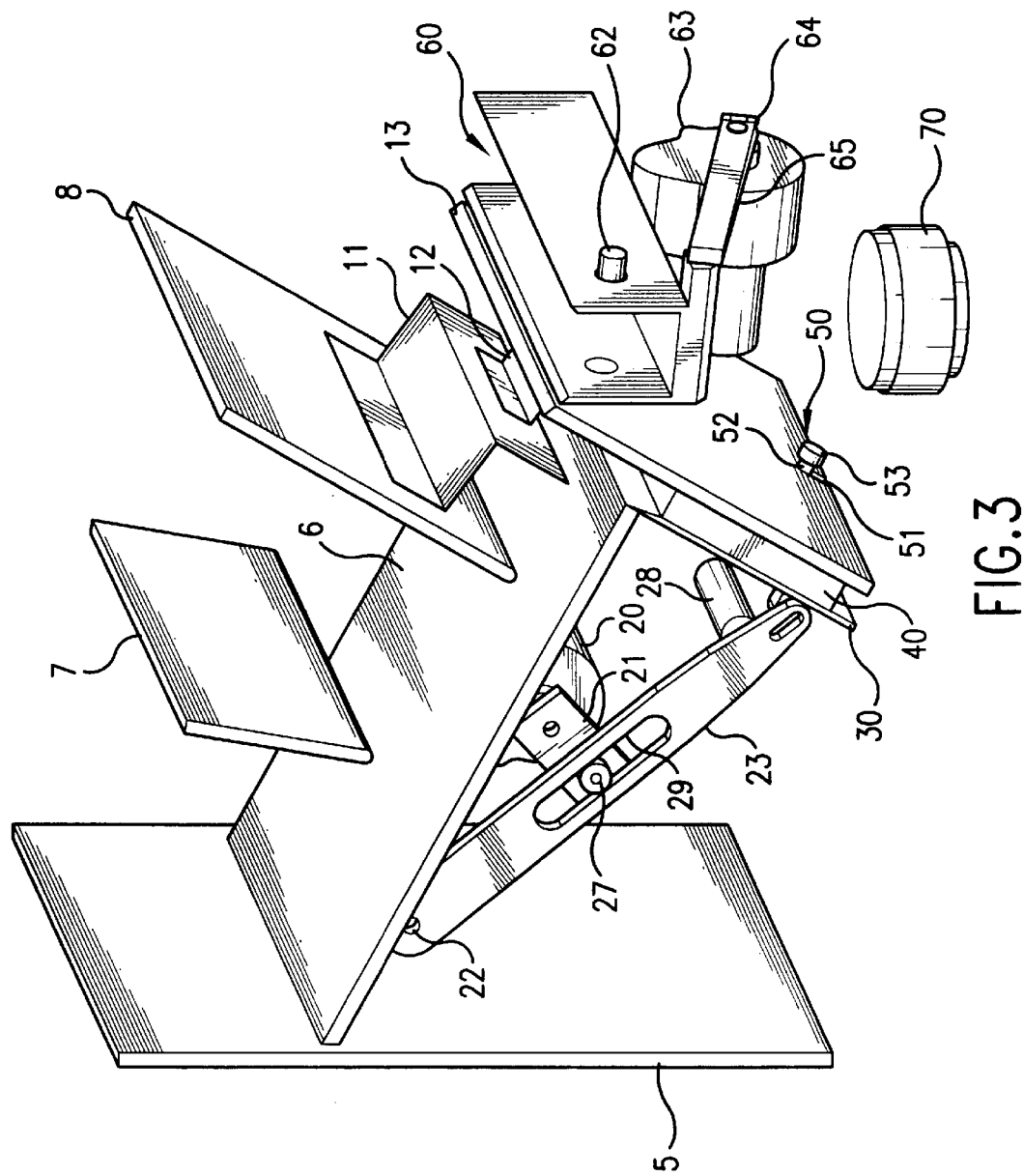
FIG. 3 illustrates a view of the mechanism of the precision hopper according to an embodiment of the present invention.
Figure 4:
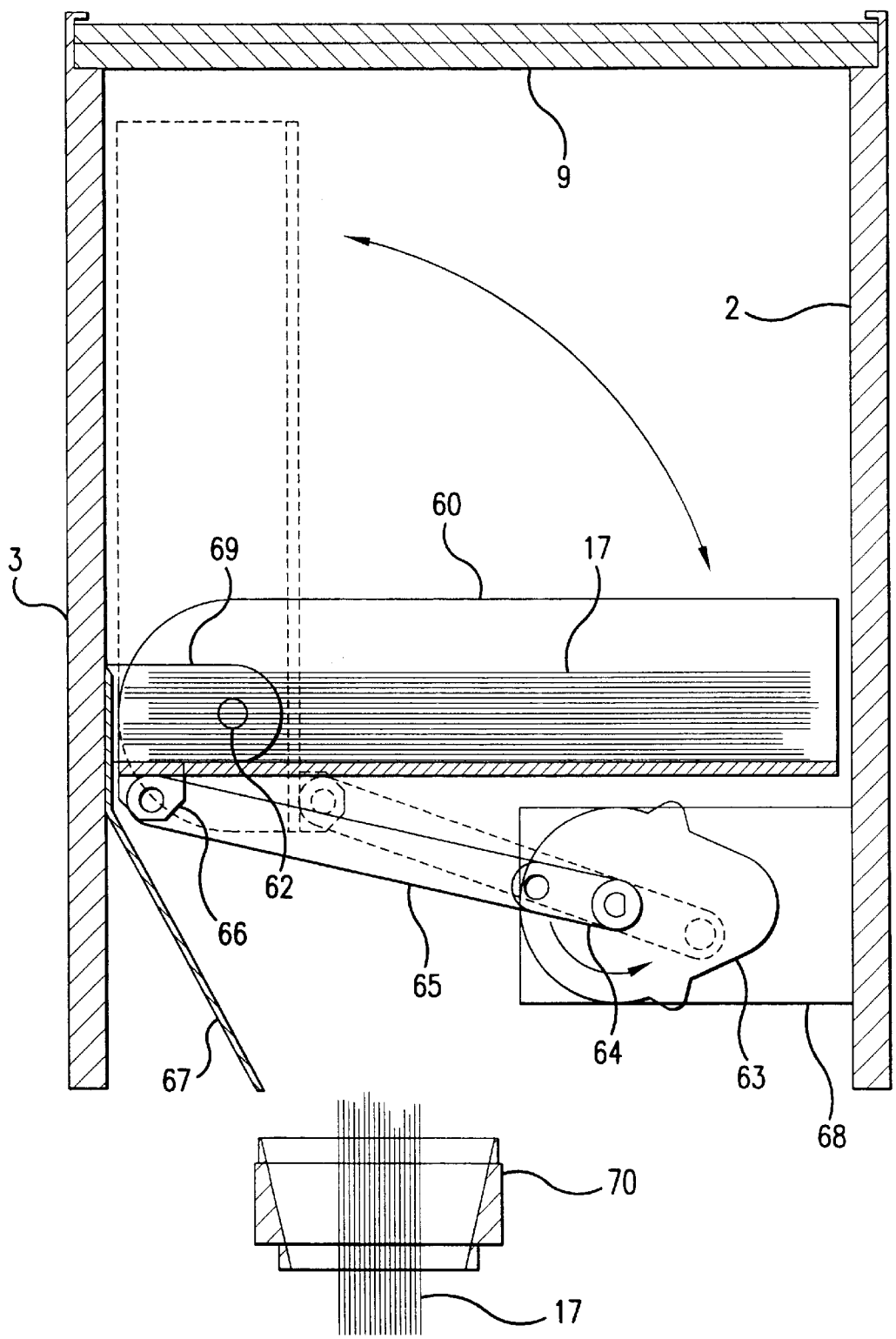
FIG. 4 illustrates an operational sequence that is capable of being preformed by the apparatus according to one embodiment of the present invention.

The mechanism of an embodiment of the present invention that allows for this rotation may be clearly seen in FIGS. 1 and 3. The motion of blade 30 may be controlled, in part, by the blade bracket 26, which is secured to the blade by pin 25 that slides in the pin slot 24 of the arm 23. Arm 23 is also rotatably attached to fixed pivot 22. During one dispensing cycle, arm 23 may swing around the pivot 22 and be driven through an oscillating stroke by blade actuating motor 20. The blade actuating motor is equipped with a crank 21 and crank roller 27 that engages the arm 23 through a roller slot 29. When the blade actuator motor 20 receives instructions to cycle through one revolution, the blade 30 travels from its standby position at the bottom of its stroke, to its raised position, and then back to its standby position. In one embodiment of the present invention, this cycle takes from 1 to 3 seconds.

In its standby position, the uppermost edge of the blade 30 is positioned flush with or below the upper surface of the sloped panel 6. In one embodiment of the present invention, the blade uppermost edge of the blade 30 is designed to be a sharpened upper edge 32 that will allow blade 30 to easily go through the food 15 with minimal disturbance or breakage. When the blade 30 is raised by the movement of the arm 23, as described above, it first passes through the food 15, and then contacts the flexible leveling tab 12. This movement of the blade 30 divides the food 15 so that it is located in two different regions. The first region is the reservoir 16, and the second region is the measured quantity 17 that will be dispensed. The measured region, which is defined by the blade 30, the flexible leveling tab 12, the spill off panel 10, the bucket 40, the front 3 of the apparatus and the back 2 of the apparatus may clearly be seen in FIG. 2(*b*).

As shown in FIG. 2(*c*), the blade pin 31 engages the bucket 40, and the blade 30 and bucket 40 combination raise to the upper limit of the blade stroke. During each stroke, blade pin 31 travels in bucket slot 41, which has a closed upper end. The present invention is designed such that when blade pin 31 travels up bucket slot 41, it engages the edge of the bucket 40 that closes the upper end of the bucket slot 41 at approximately the same time that the blade 30 contacts the flexible leveling tab 12. As the blade 30 continues through the upward stroke that is controlled by the arm 23, the blade pin 31 exerts pressure on the edge of the bucket 40 that closes the bucket slot 41, and lifts the bucket 40 and the food 15 contained therein. As the blade 30 rises above its contact point with the flexible leveling tab 12, the flexible leveling tab 12 bends and allow the blade 30 to pass. The measured quantity of food slides upward along the spill-off panel 10. As the food reaches the beveled edge 13 of the spill-off panel 10, it is free to fall into the tilting chute. The blade 30 and bucket 40 combination continue to the top of their stroke. In one embodiment of the present invention, the top of the stroke is defined so that the upper surface 42 of the bucket 40 is just above the beveled edge 13 of the spill-off panel 10, in order to release all of the food 15 contained in the measured quantity. The beveled edge 13 of the spill-off panel 10 acts to guide the falling food, adding a horizontal component to the falling food's velocity. This horizontal velocity component assures that the food will travel across the gap between the beveled edge 13 and the wall 61 of the tilting chute 60. This gap is present in one embodiment of the present invention to provide clearance for the tilting chute 60 as it rotates from horizontal to vertical during the tilting operation that occurs later in the dispensing sequence.

This use of the blade 30 and bucket 40 system provides a remarkable benefit over those devices that are known in the art, since it does not have moving parts that create the shearing motion. Such shearing motion may lead to broken or damaged food, and consequential jamming. The jamming may be caused by whole food that has become lodged in moving parts, or by the smaller, broken, portions that become similarly lodged. The present invention, in contrast, dispenses a measured quantity 17 through the use of the blade 30 and bucket 40 system. This system gently contains a measured quantity 17 of food 15, then raising the bucket 40 (which is the bottom of the area containing the measured quantity 17) and, effectively, all but one wall containing the measured quantity 17. This allows the measured quantity 17 to gently spill out, without damage, into tilting chute 60.

It should be noted that, in one embodiment of the present invention the bucket 40 remains at the bottom of its stroke, held in place by gravity and the weight of the food 15 that it supports until the bucket 40 is engaged by the blade pin 31.

As noted above, the movement of the arm 23 causes the blade 30 and the bucket 40 portion to lift up through the food, thereby isolating a measured quantity of food 17. This measured quantity 17 may be selected or altered by use of the dose adjuster 50. The dose adjuster 50 is generally composed of a dose bolt 52 that may slide into the dose slot 51 and be secured by tightening the dose nut 53. If the dose bolt 52 is secured towards the upper limit of the dose slot 51, the downward movement of the bucket 40 will be limited, thereby limiting the amount of food that may flow into the bucket 40, and hence the dispensed amount of food. The inverse applies if the dose bolt 52 is secured towards the lower limit of the dose slot 51; more food may then enter the bucket 40, and more food will be dispensed. The dose adjuster 50 has been described as using a dose bolt 52 and a dose nut 53. It should be understood by one of ordinary skill in the art that any known detent assembly would be appropriate.

In one embodiment of the present invention, there are markings beside the dose slot 51 indicating to the user the quantity of dried food that will be dispensed according to the position of the dose bolt 52. Alternatively, these markings may indicate the quantity of cooked food that may be produced from the dispensed amount.

In another embodiment of the present invention, the apparatus of the present invention may be equipped with a means to agitate the food 15 stored in the food reservoir 16. The presence of such an agitator may serve to improve the performance of the system. The agitation acts to keep the food 15 from clumping, or otherwise stacking in a manner that prevents the free-flow of food 15 down the sloped panel 6. This assists the food's 15 uniform arrival at the area where it is dispensed into the tilting chute 60. In one embodiment of the present invention, such agitation comes from light vibrations that are applied to the food reservoir 16. Alternatively, the guide panel 7 may be designed to move or vibrate by any means as is known in the art.

In one embodiment of the present invention, as shown in FIGS. 2(*a*)–(*c*), agitation may be achieved by use of an agitator plate 35 that is attached with a hinge 38 towards the center of the sloped panel 6. This agitator plate 35 may be designed to be activated by the movement of arm 23. A pin 36 may be attached to the arm 23 such that the pin 36 extends through an agitator hole 37 and rotates the agitator plate 35 every time that the arm 23 cycles through its stroke. The agitator plate 35 may be lowered as the arm 23 lowers and the food in the reservoir presses down on the agitator plate 35.

Once the blade 30 and bucket 40 have acted in concert as described above to deliver a measured amount 17 of food 15 to the tilting chute 60, the measured amount 17 of food 15 is ready to be dispensed. This is achieved by the pivotal rotation of the tilting chute 60 from horizontal to vertical about pivot 62. This rotation may be achieved by means of a tilter actuator motor 63, which may rotate the tilter through crank 64. As the crank 64 rotates, it drives the tilter link 65 and the tilting chute boss 66 through one cycle. As the tilting chute 60 approaches vertical, the measured amount 17 of food 15 slides downward. This measured amount 17 may be received by a funnel 70, or any other appropriate means as are known in the art. The food may be directed to the funnel 70 or other appropriate means by use of a guide 67. The pivot 62, guide 67 and tilter actuator motor 63 may be attached to the apparatus by means of brackets, such as bracket 68 and bracket 69.

While a tilting chute has been described in accordance with one embodiment of the present invention, it should be understood by one skilled in the art that such a chute may not be required for certain application of the present invention. For example, a funnel or other chute may be supplied that delivers the food directly, either by conveyor or under the force of gravity, to its intended destination.

Figure 5:
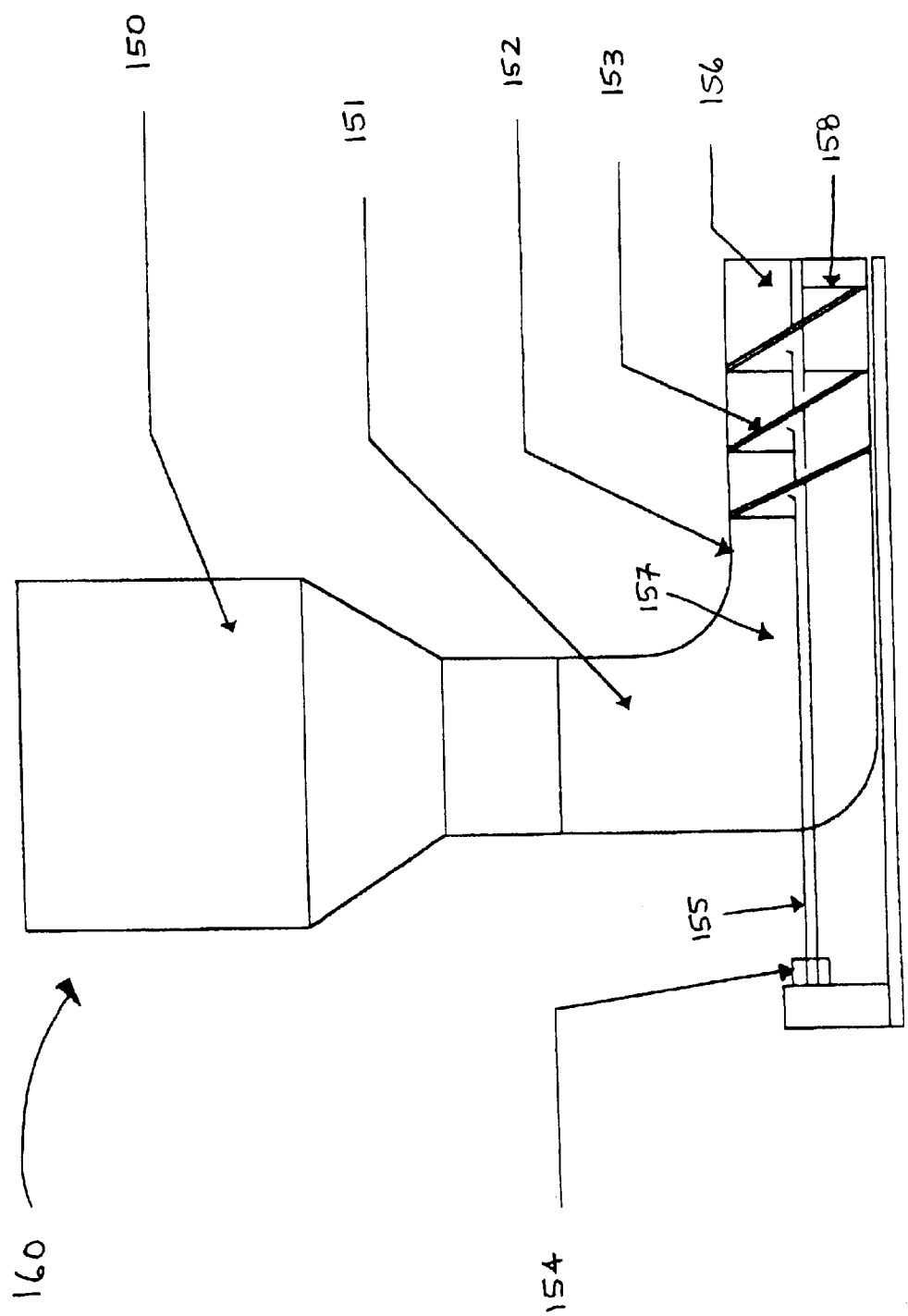
FIG. 5 illustrates an assembly of a short cut hopper, with a transparent view of the interior according to one embodiment of the present invention.

In another embodiment of the present invention, as shown in FIGS. 5 and 6, an apparatus 160 for dispensing short-cut product is displayed. While it will be understood by one of ordinary skill in the art that the apparatus may be formed so that it comprises only one element, it will be described as being formed from a plurality of elements for ease of description. The apparatus 160 comprises a container 150 coupled to and located generally above a holding area 151. The holding area 151 is coupled to and located generally above a generally tubular auger enclosure 152. Material placed in the container 150 may travel under the force of gravity through the holding area 151 and into the auger enclosure 152. The auger enclosure 152 partially houses a rod 155 and an auger 153. The auger 153 is coupled to or formed integrally with the rod 155 at a dispensing end 156 of the auger enclosure 152. The rod 155 is also attached to a motor 154 which is preferably located outside an entry area 157 of the auger enclosure 152.

While the present invention describes the use of an auger 153, it will be understood by one of ordinary skill in the art that other product-conveying mechanisms are within the ambit of this invention. By way of example, a conveyor, buckets or paddles separating the product into defined allotments may be used.

The container 150 is preferably made of a clear material such as polycarbonate, plastic, glass or the like. Such construction allows the user to view the level of product in the container, and make any adjustments deemed necessary, such as adding product. Such construction also allows the user to readily determine what product is in the container 150. The container 150 is preferably designed for dispensing particles not to exceed ½ inch in length, with a diameter generally not greater than ¾ inch. Of course, one skilled in the art would realize that the size of the apparatus may be varied to dispense products having larger, or smaller, sizes.

Once loaded with food 15, the walls of the container 150 and gravity guide the food 15 to an opening located at the bottom of the container 150. The food 15 will then move from the container 150 to the holding area 151 due to the force of gravity and the weight of food above. As noted above, while an agitating mechanism may be coupled to the container 150, it is not required.

Once the food 15 has moved to the holding area 151, the force of the weight of other food in the container 150 and gravity move the food 15 in the holding area 151 into the entry area 157 of the auger enclosure 152.

Once the food 15 is loaded into the entry area 157 of the auger enclosure 152, a user may then actuate the motor 154. The motor 154 rotates the rod 155 and the auger 153. The auger 153 is formed from flies 158 (threads) that are attached to the rod 155 at the dispensing end 156 of the auger enclosure 152. The threads 158 connect to the rod 155 in a helical fashion. The rotation of the threads 158 separates the particles 15 into allotments of a predetermined size. The size of the allotments may be adjusted by increasing or decreasing the distance between each thread 158 of the auger 153. Smaller allotments may be dispensed by decreasing the distance between each thread 158 while larger allotments require increasing the distance between each thread 158. Alternatively, the size of the allotments may be varied by varying the amount of time for which the auger rotates. Longer rotation will provide for larger allotments.

The downward force of the particles 15 in the container 150 and holding area 151 in conjunction with the rotating auger 153 move the particles from the entry area 157 to the dispensing end 156 of the auger enclosure 152. In the preferred embodiment of the present invention, the position of the first auger thread 158 is not exposed to the holding area 151 since this may cause a sheering effect on the particles 15.

In another embodiment of the present invention, as shown in FIG. 7, an apparatus for dispensing long-cut food 170 is illustrated. In this embodiment of the present invention, long food particles 15 are placed within a refillable container 171. The refillable container 171 has a bottom that is made up of a front end, a back end, and on the left and right side, two guide panels 172, 173. The guide panels 172, 173 are joined to the front and back end to define the borders of the refillable container 171. The refillable container 171 is preferably made out of clear material. By way of example, polycarbonate is one type of clear material that may be used for the refillable container 171. As noted above, the clear material allows the user to visually control the level of food 15 in the refillable container 171.

The food 15 is guided to an opening 189 at the bottom of the refillable container 171 by the shape of the walls of the guide panels 172, 173 and gravity. The opening may be generally rectangular, square, round, oval, hexagonal or the like. Both guide panels 172, 173 are angled in a downward direction to direct the food 15 toward the opening 189. One guide panel 172 may be designed to slope lower and beneath the other guide panel 173. A sliding and removable gate 174 is attached underneath the higher guide panel 173. By sliding the removable gate 174 up and down, a user may open and close the opening at the bottom of the refillable container 171, thereby regulating the amount of food 15 allowed to pass into the holding area 179. During normal operation, the removable gate 174 is ideally closed when the user is filling the refillable container 171 and open when the apparatus 170 is automatically dispensing food 15.

When the user releases food 15 from the refillable container 171 using the removable gate 174, the food collects in the holding area 179 due to the force of gravity and the guidance of the two precision flaps 175, 176. The two moveable precision flaps 175, 176 preferably slope in a downward, inward direction in the holding area 179 and guide the food 15 to a grooved rotational cylinder 183. The opening 181 in the rotational cylinder, or cavity 181, collects a specific and consistent amount of food in its chamber because of its defined area. The amount of food 15 collected and dispensed can be varied by changing the area size defined by the cavity 181.

A motor 180 is coupled to the grooved rotational cylinder 183. Upon actuation of the motor 180, the grooved rotational cylinder 183 rotates clockwise or counterclockwise. The user may select whether the cylinder consistently rotates clockwise, consistently rotates counterclockwise, or some variation thereof, such as alternating directions. A magnetic switch (not shown) may be used to limit the motion of the grooved rotational cylinder 183. That is, for example, the magnetic switch may allow the rotational cylinder 183 to rotate through only 180°. When the grooved rotational cylinder 183 turns clockwise or counterclockwise, only the food 15 within the cavity 181 will rotate with the cylinder. As the grooved rotational cylinder 183 turns, one of the moveable precision flaps 175, 176 levels the food 15 contained within the cavity 181 depending on the direction of the turn.

The precision flaps 175, 176 rest on top of and slide along the upper surface of the main guides 177, 178. From a side view, as shown in FIG. 7, the upper portion of the precision flaps 175, 176 are L-shaped and rest on the upper portion of the main guides 177, 178. The L-shaped top of the precision flaps 175, 176 and the upper portion of the main guides 177, 178 limit the downward movement of the flaps. As shown in FIG. 7, the inside bottom of the precision flaps 175, 176 may have an angle of about 45 degrees. A precision flap 175, 176 has a length equal to the thickness of the L-Shape, plus the length of a main guide 177, 178, plus the thickness of a stationary flap 182, plus the gap 188 between the stationary flap 182 and the grooved rotational cylinder 183, plus ⅛ inch. As the cavity 181 passes underneath a precision flap 175, 176, the sliding ability and length of the precision flap 175, 176 push the inside bottom of the flap into the groove by as much as ⅛ inch. This results in a precision flap 175, 176 leveling the top surface of the food 15 in the cavity 181 as the grooved rotational cylinder 183 makes the counterclockwise or clockwise turn. After the cavity 181 empties the food 15 into the dispensing area 187, it then returns to the original position in the holding area 179. The bottom 45 degree cut and the ability to slide permits the precision flap 175, 176 to be pushed from the cavity 181 back onto the surface of the grooved rotational cylinder 183. The precision flaps 175, 176 and the surface of the grooved rotational cylinder 183 also contain any food 15 not transported by the cavity 181 within the holding area 179.

Stationary flaps 182 located to the left and right of precision flaps 175, 176 and underneath the main guides 177, 178 also serve to level the food 15 contained in the cavity 181 and prevent unwanted excess quantity of food 15 from moving to the dispensing area 187. Between the stationary flaps 184 and the grooved rotational cylinder 183 a gap 188 must be maintained. This gap 188 may range in size from approximately ½ the diameter of a food particle to approximately ½ the diameter of a food particle. In the preferred embodiment of the present invention, this gap 188 is preferably at a minimum ⅞ the diameter of a food particle or at a maximum the actual diameter of a food particle. The importance of the gap 188 is that it allows the few strings of food that are not fully in the cavity 181 and not leveled off by a precision flap 175, 176 to still be delivered to the dispensing area 187. The absence of such a gap 188 will cause sheering and blockage of the turning mechanism of the grooved rotational cylinder 183.

Once the grooved rotational cylinder 183 turns the cavity 181 from the holding area 179 to the dispensing area 187, gravity causes the food 15 to empty from the cavity 181 and slide down a downward sloped shoot 184. Tilters 185, 186 collect and gather the food 15 arriving from the shoot 184. Each tilter 185, 186 is attached to a motor 180. The motor moves the tilter that has just been filled with product from a horizontal position to a vertical position. The specific portion of food 15 is then dispensed from the long-cut food apparatus 170 by sliding down the incline created by the tilter and motor 180.

The operations of the present invention, as described above, may be controlled from a control panel using sensors, switches and motor controllers as are known in the art. The operations may also be monitored and controlled remotely, so that it is possible to monitor the operations of the invention from a remote location. Such monitoring could serve, for example, to ascertain when it is necessary to add more food 15, or whether the appropriate measures amounts 17 have been dispensed.

It will be apparent to a person of ordinary skill in the art that embodiments of the present invention are not limited in their design or application to specific embodiments disclosed herein. Thus, the present invention is intended to encompass all of the embodiments disclosed and suggested herein as defined by the claims appended hereto and any equivalents thereof.

What is claimed is:

1. An apparatus for easy dispensing predetermined allotments of product, the apparatus comprising:

a container having a bottom portion that is defined by a front panel, a back panel, and first and second sloping panels;

an allotment dispenser comprising first and second moveable flaps each having an upper and a lower end, said flaps positioned adjacent to the bottom portion of the container, the flaps and the bottom of the container defining a holding area located below the container, a rotational cylinder defining a cavity, the cylinder abutting the lower ends of the first and second flaps, means coupled to the rotational cylinder for selectively rotating the cylinder, and first and second stationary flaps located adjacent to and extending in a circumferential direction around the rotational cylinder, the stationary flaps defining a gap between the first and second stationary flaps and the rotational cylinder; and an inclined member located below the rotational cylinder for directing the dispensed selective quantity of product in a predetermined direction.

2. The apparatus for easy dispensing predetermined allotments of product as in claim 1, wherein the container is clear.

3. The apparatus for easy dispensing predetermined allotments of product as in claim 1, wherein the first sloping panel extends lower than the second sloping panel.

4. The apparatus for easy dispensing predetermined allotments of product as in claim 1, wherein an end of the first precision flap located adjacent to the rotational cylinder is angled.

5. The apparatus for easy dispensing predetermined allotments of product as in claim 1, wherein the gap has a width of from about 0.75 percent of the diameter of the product being dispensed to about 100 percent of the diameter of the product being dispensed.

6. The apparatus for easy dispensing predetermined allotments of product as in claim 1, the apparatus further including a gate coupled to the second sloping panel, wherein operation of the gate serves to control the flow of product out of the container.

7. The apparatus for easy dispensing predetermined allotments of product as in claim 1, further including guide panels abutting the first and second moveable precision flaps.

8. The apparatus for easy dispensing predetermined allotments of product as in claim 1, further including a motor-actuated tiller located towards the downwards end of the sloped chute, wherein upon actuation, the tiller rotates to vertical to dispense the product.

* * * * *